US012525729B2

(12) United States Patent
Hefele et al.

(10) Patent No.: US 12,525,729 B2
(45) Date of Patent: Jan. 13, 2026

(54) MOBILE COMMUNICATION ANTENNA

(71) Applicant: Telefonaktiebolaget LM Ericsson (publ), Stockholm (SE)

(72) Inventors: Jürgen Hefele, Waakirchen (DE); Tanja Hefele, Waakirchen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 71 days.

(21) Appl. No.: 18/685,058

(22) PCT Filed: Aug. 25, 2021

(86) PCT No.: PCT/EP2021/073520
§ 371 (c)(1),
(2) Date: Feb. 20, 2024

(87) PCT Pub. No.: WO2023/025382
PCT Pub. Date: Mar. 2, 2023

(65) Prior Publication Data
US 2024/0356240 A1 Oct. 24, 2024

(51) Int. Cl.
*H01Q 21/26* (2006.01)
*H01Q 1/24* (2006.01)
*H01Q 5/364* (2015.01)
*H01Q 5/48* (2015.01)
*H01Q 19/10* (2006.01)

(52) U.S. Cl.
CPC ............. *H01Q 21/26* (2013.01); *H01Q 1/241* (2013.01); *H01Q 5/364* (2015.01); *H01Q 5/48* (2015.01); *H01Q 19/108* (2013.01)

(58) Field of Classification Search
CPC ........ H01Q 1/241; H01Q 1/246; H01Q 5/364; H01Q 5/48; H01Q 19/108; H01Q 21/26
See application file for complete search history.

(56) References Cited

U.S. PATENT DOCUMENTS

2014/0035792 A1* 2/2014 Schadler ............ H01Q 21/0087 343/798
2020/0067182 A1 2/2020 Huang

FOREIGN PATENT DOCUMENTS

DE 4438809 A1 5/1996
EP 1434300 A2 6/2004
WO 2011118170 A1 9/2011

(Continued)

OTHER PUBLICATIONS

International Search Report and Written Opinion for International Patent Application No. PCT/EP2021/073520, mailed May 20, 2022, 9 pages.

*Primary Examiner* — Hoang V Nguyen
(74) *Attorney, Agent, or Firm* — Withrow & Terranova, PLLC

(57) ABSTRACT

A mobile communication antenna with at least one radiator that comprises first and second dipoles, which comprise first and second dipole halves. Each dipole half comprises first and second connecting elements, which comprise first and second ends. Each connecting element is arranged with its first end on a support arrangement and extends away from it. The second ends of the first and second connecting elements of the respective dipole half are connected to one another via a radiator structure of the respective dipole half. Each dipole half is, via the first and/or second connecting element feedable and connected or coupled to ground.

15 Claims, 13 Drawing Sheets

(56) References Cited

FOREIGN PATENT DOCUMENTS

| | | | | | |
|---|---|---|---|---|---|
| WO | 2017086855 | A1 | | 5/2017 | |
| WO | 2017178037 | A1 | | 10/2017 | |
| WO | WO-2018224666 | A1 | * | 12/2018 | ............... H01Q 1/26 |

* cited by examiner

MOBILE COMMUNICATION ANTENNA

This application is a 35 U.S.C. § 371 national phase filing of International Application No. PCT/EP2021/073520, filed Aug. 25, 2021, the disclosure of which is incorporated herein by reference in its entirety.

TECHNICAL FIELD

The invention relates to a mobile communication antenna which can be used to transmit and receive mobile communication signals. The mobile communication antenna is configured to communicate with one or more mobile devices that can be held by a user. Those mobile communication antennas are normally mounted on masts or on roof tops.

BACKGROUND

A radiator for a mobile communication antenna is known from the EP 1 434 300 A2. The radiator is cross-shaped and comprises four connection points. Each connection point can either be used for feeding a signal or for establishing a connection to ground. As such, the radiator can be used for one polarization or two polarizations. The radiator is made of die-cast metal, wherein the feeding connection is soldered to respective signal line.

As a result, care has to be taken to obtain a reproducible connection regarding the solder joints. This results in PIM (passive intermodulation) problems. Furthermore, the use of die-cast materials can result in a decreased electrical performance. The possibilities on how the signal can be fed limits also the electrical performance. Another disadvantage is that an expensive tool is needed. Furthermore, it is more difficult/expensive to adapt or scale the radiator. The choice of materials is also limited. Regarding soldering, an appropriate material has to be chosen or the surface of the material has to be treated/coated (cost, PIM). Die-casted parts are heavy because of higher wall thicknesses. It is also more difficult to implement very fine or complex structures.

SUMMARY

As such, it is the object of the present invention to create a mobile communication antenna with a radiator that can be easily produced thereby offering a high flexibility and minimum passive intermodulation (PIM).

The object is solved with the mobile communication antenna according to claim 1. Advantageous further developments of the mobile communication antenna are described in the dependent claims.

A mobile communication antenna according to the present invention comprises a support arrangement and at least one radiator. The at least on radiator is preferably configured to transmit and receive mobile communication signals in two polarizations. Polarizations could be for example linear +45°/−45° slant, linear 0°/90° horizontal and vertical, elliptic or circular. The mobile communication antenna can be mounted on a mast and/or on a roof for example. The at least one radiator comprises first and second dipoles, wherein the first and second dipoles each comprise a first and a second dipole half. The first and second dipoles are arranged on a first side of the support arrangement. Each dipole half comprises first and second connecting elements, wherein the first and second connecting elements comprise a first end and a second end. Each connecting element is arranged with its first end on the support arrangement and extends away from it. Each dipole half comprises a radiator structure, wherein the second ends of the first and the second connecting elements of the respective dipole half are connected to one another via the radiator structure of the respective dipole half. As such, the radiator structure is spaced apart from the support arrangement. In addition, each dipole half is feedable via the first and/or second connecting element. Each dipole half is also connected or coupled to ground via the first and/or second connecting element.

Compared to the state of the art, the radiator according to the present invention comprises a larger number of connection possibilities (first ends of the first and second connecting element) so that it can be used more flexible. As such the feeding of a signal as well as a connection to ground is possible in close proximity. As such, the electrical performance is increased.

In a preferred embodiment of the mobile communication antenna, the at least one radiator is made of a single piece. This means the first and second dipoles are integrally formed. This comes with the advantage of an easier placement.

In another preferred embodiment of the mobile communication antenna, the at least one radiator is a bent part and also a punched and/or lasered part. By using those processes instead of a die-cast process, precise structures of the at least one radiator can be obtained. Furthermore, the at least one radiator is thinner than the radiator according to the state of the art. In addition, production is less expensive compared to the radiator of the state of the art.

In a preferred embodiment of the mobile communication antenna, a connecting element of the first dipole half of the first dipole is formed integrally (single-piece) with a connecting element of the adjacent first dipole half of the second dipole in the region of the respective first ends. In other words, the two connecting elements form a joint connection in the area of their first ends. Furthermore, a connecting element of the second dipole half of the first dipole is formed integrally with the connecting element of the adjacent second dipole half of the second dipole in the region of the respective first ends. It is beneficial, that the at least one radiator is made of a single-piece by connecting respective connecting elements at their first ends together. As such, adjacent connecting elements of the different dipoles are connected together in the region of their first ends, wherein connecting elements of the same dipole half are connected together by using the radiator structure arranged at their second ends.

In a preferred embodiment of the mobile communication antenna, the first connecting element of the first dipole half of the first dipole is formed integrally (single-piece) with the second connection element of the first dipole half of the second dipole in the region of the respective first ends so that a first support surface is formed. The same is true for the other connecting elements. As such, the second connecting element of the first dipole half of the first dipole is formed integrally with the first connecting element of the second dipole half of the second dipole in the region of the respective first ends thereby forming a second support surface. The first connecting element of the second dipole half of the first dipole is formed integrally with the second connecting element of the second dipole half of the second dipole in the region of the respective first ends thereby forming a third support surface. The second connecting element of the second dipole half of the first dipole is formed integrally with the first connecting element of the first dipole half of the second dipole in the region of the respective first ends thereby forming a fourth support surface. It is very beneficial that respective first, second, third and fourth support surfaces are formed which allow a smooth placement of the at least one radiator on the support arrangement.

In another preferred embodiment of the mobile communication antenna, the support arrangement comprises a metal layer on the first side if the support arrangement which is connected to ground. The first, second, third and fourth support surfaces are arranged on said metal layer. It is very beneficial that by having a support surface which is predominantly or completely smooth that a reproducible coupling to ground can be achieved. This is preferably true for all of the support surfaces and therefore for all of the dipole halves.

In another preferred embodiment of the mobile communication antenna, a dielectric is arranged between the metal layer and the first, second, third and fourth support surfaces. The dielectric is preferably formed by solder resist. In that case, the respective dipole halves are "coupled" to ground. If instead a solder connection (galvanic connection) would have been used, each dipole half would be "connected" to ground. The use of a solder resist as a dielectric comes also with the advantage that the support surfaces can be arranged really closed to the metal layer so that a strong and reproducible coupling is achieved.

In another preferred embodiment of the mobile communication antenna, the first, second, third and/or fourth support surface is glued to the first side of the support arrangement. In that case no external holding device has to be used so that the mobile communication antenna has a compact design.

In another preferred embodiment of the mobile communication antenna, the first and second support surfaces are spaced apart from each other thereby forming a first gap. The second and the third support surfaces are also spaced apart from each other forming a second gap. The same is also true for the third and fourth support surfaces which are spaced apart from each other forming a third gap. The fourth and first support surfaces are spaced apart from each other forming a fourth gap. A metal layer on the first side of the support arrangement comprises first, second, third and fourth recesses in the region of the gaps, thereby forming first, second, third and fourth slots respectively. In other words, between the respective support surfaces where the gap is formed, the metal layer comprises respective recesses. A second side of the support arrangement comprises first, second, third and fourth feed structures. The first feed structure crosses the first slot. The second feed structure crosses the second slot. The third feed structure crosses the third slot. The fourth feed structure crosses the fourth slot. In that case, the at least one radiator can be fed without the use of any solder joint and/or without the use of any cable connection just by using a slot structure.

In a preferred embodiment of the mobile communication antenna, the first feed structure is a metal layer on the second side of the support arrangement, wherein the first feed structure can be widened in the region of the first slot. In addition or alternatively, the second feed structure is a metal layer on the second side of the support arrangement, wherein the second feed structure can be widened in the region of the second slot. In addition or alternatively, the third feed structure is a metal layer on the second side of the support arrangement, wherein the third feed structure can be widened in the region of the third slot. In addition or alternatively, the fourth feed structure is a metal layer on the second side of the support arrangement, wherein the fourth feed structure can be widened in the region of the fourth slot. This comes with the benefit that the coupling is increased. In another preferred embodiment of the mobile communication antenna, the first, second, third and fourth recesses comprise a widened end, whereby the first, second, third and fourth slots also comprise a widened end. This increases the electrical performance. In addition or alternatively, the first, second, third and fourth feed structures widen towards their open ends. In addition or alternatively, the length of the first, second, third and fourth feed structures from where they cross the respective slot to the open ends is approximately $\lambda/4$ where $\lambda$ is the wave length corresponding to the center frequency of the frequency band the radiator is used for and taking into account the electrical properties of the support arrangement.

In another preferred embodiment of the mobile communication antenna, the first, second, third and fourth support surfaces comprise a cutout that is open to one side. A metal layer on the first side of support arrangement comprises first, second, third and fourth recesses in the region of the first, second, third and fourth cutouts of the respective support surface. As such, first, second, third and fourth slots are formed. A second side of the support arrangement comprises first, second, third and fourth feed structures. The first feed structure crosses the first slot, the second feed structure crosses the second slot, the third feed structure crosses the third slot and the fourth feed structure crosses the fourth slot. As such, two connecting elements of different dipole halves of different dipoles are feedable with one signal. In other words, the radiator is now fed in all of its four corners. Preferably, the cutouts are directed to the outside of the at least one radiator and as such, the cutouts are not facing the centre of the at least one radiator. As such, another radiator can be placed inside such a radiator.

In a preferred embodiment of the mobile communication antenna, the at least one radiator is attached to the support arrangement with its first and second dipoles solder-free. As such, the manufacturing process is simplified and passive intermodulation is reduced.

In another preferred embodiment of the mobile communication antenna, exactly one connecting element of the first dipole half of the first dipole and exactly one connecting element of the second dipole half of the first dipole and exactly one connecting element of the first dipole half of the second dipole and exactly one connecting element of the second dipole half of the second dipole are connected to each other and formed in one piece and are capacitively coupled or galvanically connected to ground. The other connecting element of the first dipole half of the first dipole and the other connecting element of the second dipole half of the first dipole are feedable with a first signal in phase or in antiphase. The other connecting element of the first dipole half of the second dipole and the other connecting element of the second dipole half of the second dipole are also feedable with a second signal in phase or in antiphase.

In another preferred embodiment of the mobile communication antenna, the radiator structure of each dipole half comprises radiator segments extending away from the first and the second connecting elements of the respective dipole half and spaced apart from the first and second connecting elements when running towards each other. The radiator segments are then connected to each other thereby enclosing an area. The radiator structure comprises a separation segment, wherein the area is separated into two sub-areas of the different length such that the radiator structure is configured to operate in different mobile communication bands. The separation segment preferably extends from that position where the radiator segments are connected to each other in direction of the first and second connecting elements.

In a preferred embodiment of the mobile communication antenna, a plurality of radiators is arranged on the first side of the support arrangement. The support arrangement is a printed circuit board. A metal sheet arrangement and/or partially metallized dielectrics like plastic is/are arranged between some or all of the radiators on the first side of the support arrangement, thereby forming a reflector arrangement. The metal sheet arrangement and/or the partially metallized dielectrics is/are preferably that part which gives stability to the support arrangement. The support arrangement can be screwed to the metal sheet arrangement and/or to the partially metallized dielectrics. Preferably, expanding rivets are used for fixing the support arrangement to the metal sheet arrangement and/or to the partially metallized dielectrics. As such, no metal screws are needed for a defined contact. This reduces or avoids PIM. The printed circuit board preferably comprises only one dielectric in the middle and metal layers on the first side and the second side.

In another preferred embodiment, the mobile communication antenna comprises different radiators. A first radiator is thereby arranged within a second radiator.

BRIEF DESCRIPTION OF THE DRAWINGS

Various exemplary embodiments of the invention will be described as an example hereinafter with reference to the drawings. The same items have the same reference numbers. The corresponding figures of the drawings show in detail:

FIGS. 4A, 4B: show different embodiments that describe how a feeding structure for a slot system could look like;

DETAILED DESCRIPTION

Figure 1B:
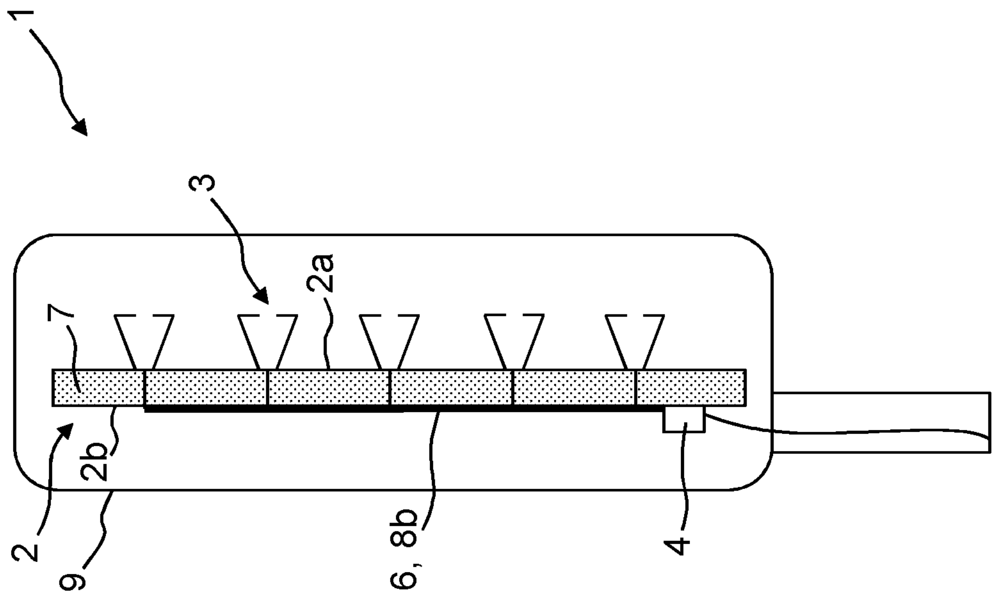
FIGS. 1A, 1B, 1C: show different embodiments of a mobile communication antenna.
Figure 1A:
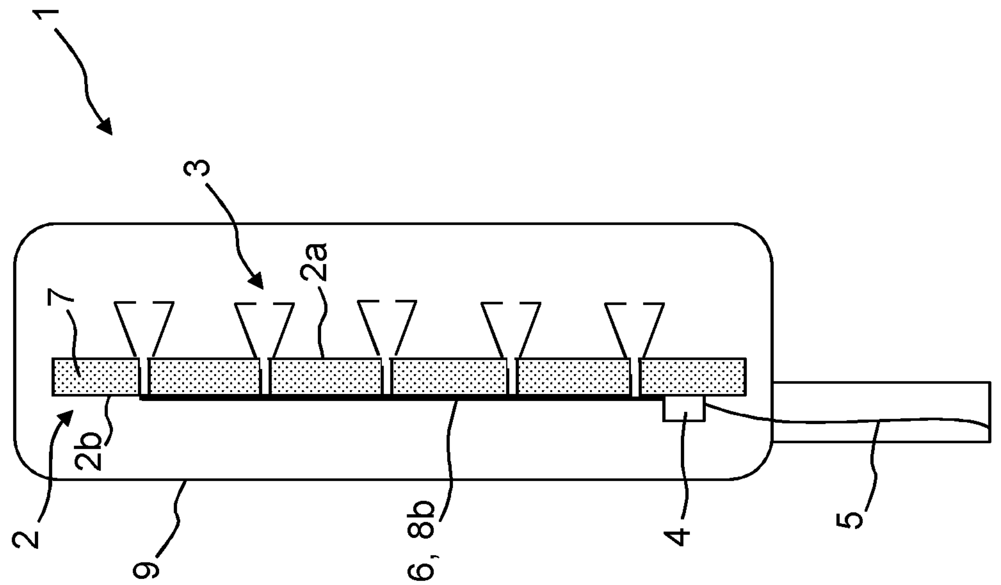
Figure 1D:
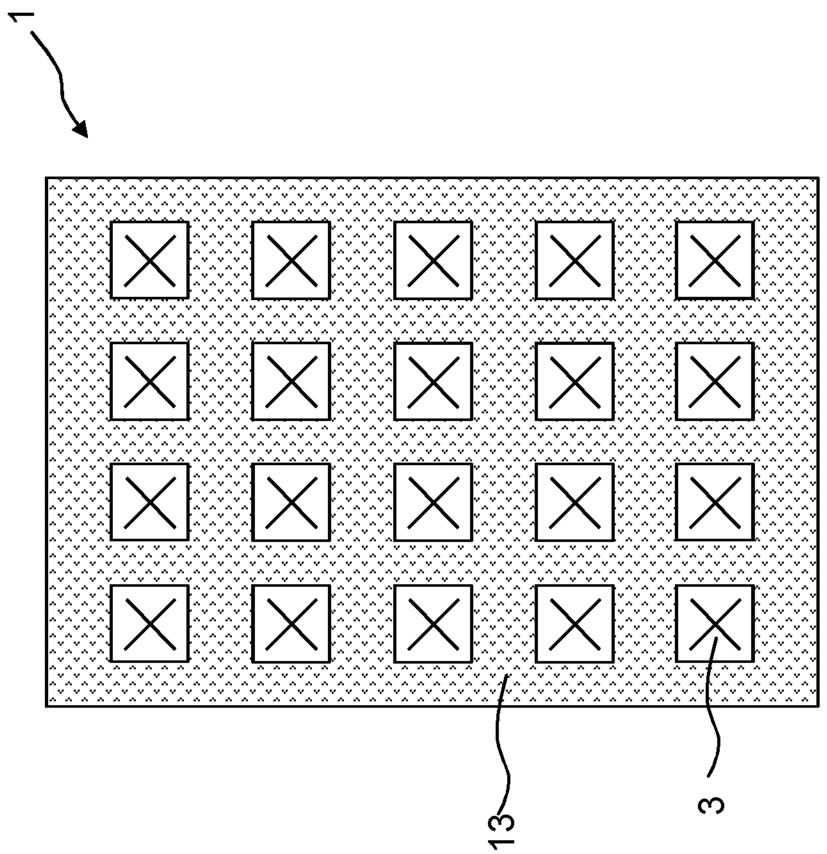
FIG. 1D: shows a view on a front side of a mobile communication antenna with a plurality of radiators that are surrounded by a reflector arrangement.
Figure 1C:
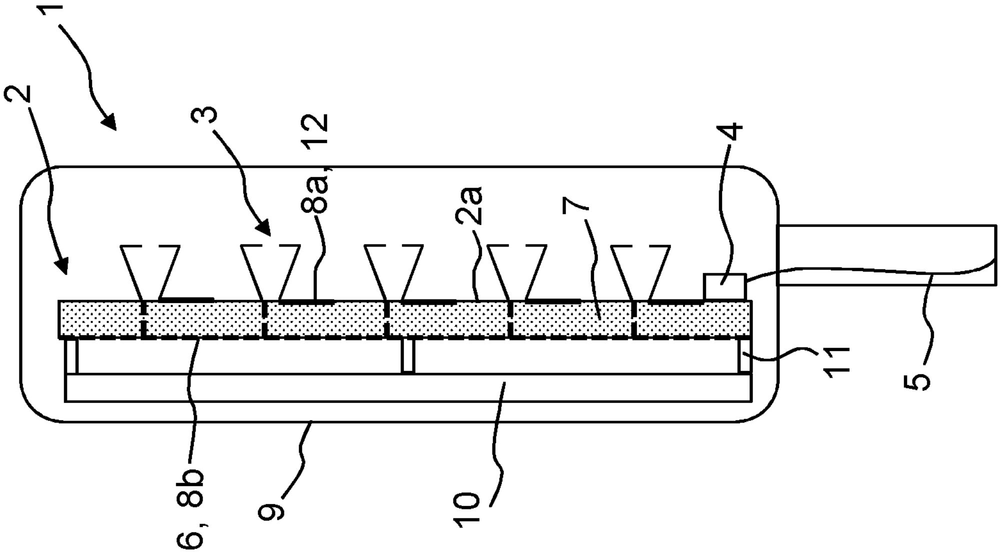

FIGS. 1A, 1B, 1C show different embodiments of a mobile communication antenna 1 according to the present invention. The mobile communication antenna 1 comprises a support arrangement 2 and at least one radiator 3. The at least one radiator 3 is preferably a dual-polarized radiator 3.

The at least one radiator 3 is arranged on a first side 2*a* of the support arrangement 2. Within FIG. 1A additional components 4, like connectors, a radio, filters and phase-shifters could be arranged on a second side 2*b* of the support arrangement 2. The additional components 4 are connected via a cable 5 to a base station (not shown).

Within FIG. 1A signal lines 6 for feeding the at least one radiator 3 are arranged on the second side 2*b* of the support arrangement 2. Also within FIG. 1A the at least one radiator 3 is preferably fed via a slot arrangement. Preferably, the at least one radiator 3 is free of a solder joint and further preferably not wired to a cable for operation.

Within FIG. 1B the at least one radiator is galvanically connected to the signal lines 6. The support arrangement 2 is preferably a printed circuit board. The printed circuit board comprises a dielectric 7 in the middle and metal layers 8*a*, 8*b* on the first side 2*a* and the second side 2*b*. The signal lines 6 could be formed by parts of the metal layer 8*a*.

The at least one radiator 3 as well as the support arrangement 2 and the additional components 4 are enclosed by a radome 9.

FIG. 1C describes another embodiment of the mobile communication antenna 1. In that case some or all of the additional components 4 are arranged on the first side 2*a* of the support arrangement 2. A structure 10 for stabilizing the support arrangement 2 is arranged on the second side 2*b* of the support arrangement 2. Spacers 11 can be used, so that the support arrangement 2 is arranged with its second side 2*b* at a distance from the structure 10. Electrical components could also be arranged within the structure 10.

With a dashed line the signal line 6 is shown. The signal line 6 preferably runs predominantly on the second side 2*b* of the support arrangement 2. A solid line 12 describes a metal layer 8*a* connected to ground. This indicated that the at least one radiator 3 is connected and/or coupled to ground.

FIG. 1D shows a view on the front side of the mobile communication antenna 1. A plurality of radiators 3 are shown which are arranged in several columns. In this case, four columns exist, wherein five radiators 3 are arranged in each column. However, the amount of the columns as well as the amount of radiators 3 within each column can vary. The radiators 3 are surrounded by a reflector arrangement 13. The reflector arrangement 13 could be a sheet metal. The reflector arrangement 13 could also be made of or comprise a dielectric or dielectrics which is/are at least partially or fully covered with a metal layer. If more dielectrics are used, they could also be connected together. This connection is preferably achieved without the use of screws and/or solder joints. For example, a snap-in connection between two elements can be used. Preferably the connection is arranged in such a way the elements can be aligned at desired angles (for example 0° 45°, 90°) towards each other. As such, the reflector arrangement 13 can be built according to individual needs. The sheet metal comprises cutouts allowing the radiators 3 to transmit and receive mobile communication signals. The reflector arrangement 13 thereby provides stability for the support arrangement 2. In that case the reflector arrangement 13 is arranged on the first side 2*a* of the support arrangement 2. The support arrangement 2 could be screwed to the reflector arrangement 13. Preferably, expanding rivets are used for fixing the support arrangement 2 to the reflector arrangement 13. However, a distance between the support arrangement 2 and the reflector arrangement 13 could be maintained. It is obvious, that the radiators 3 protrude above the reflector arrangement 13 which means that the reflector arrangement 13 is arranged closer to the support arrangement 2 than the end of the radiators 3.

Figure 2:
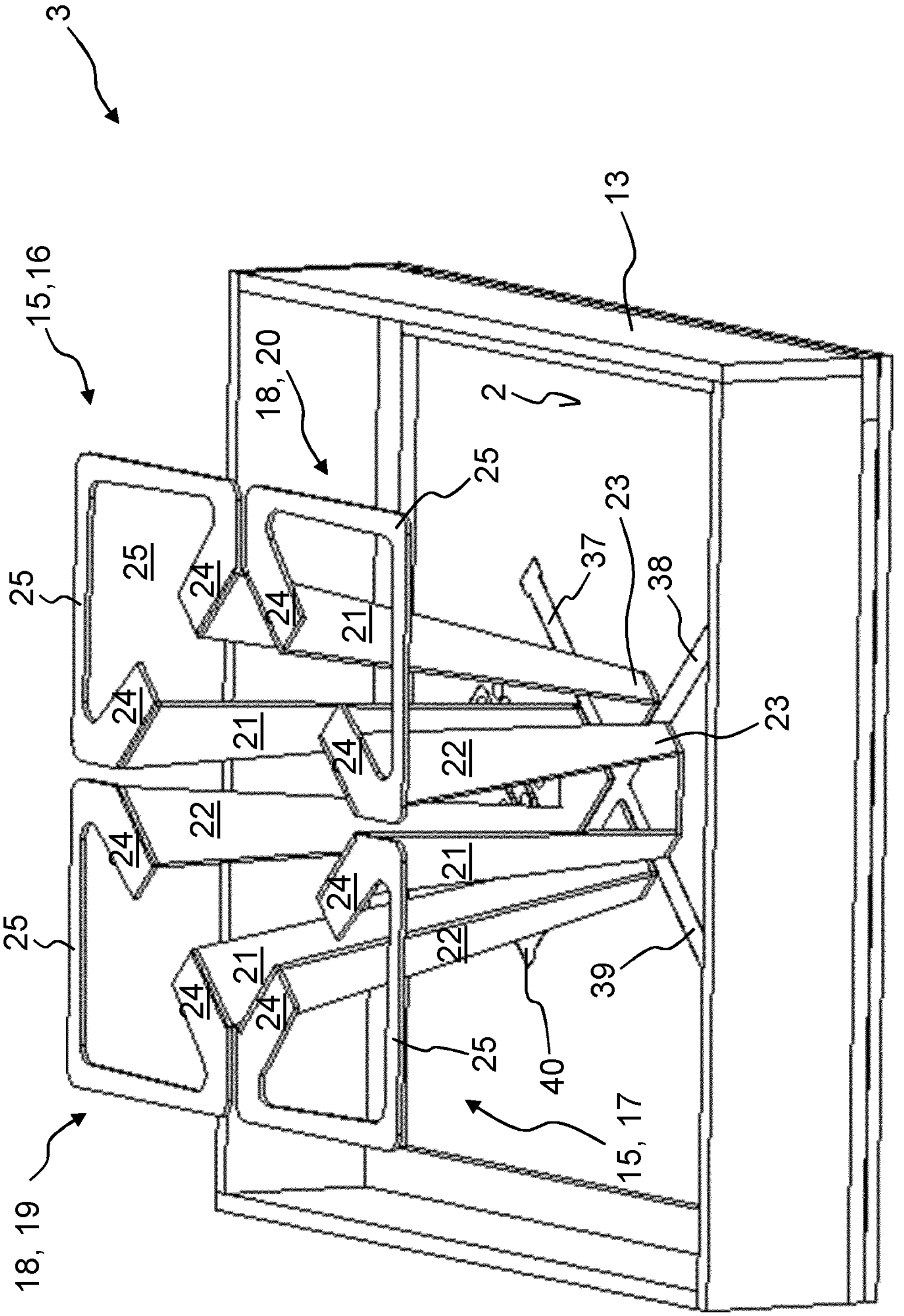
FIG. 2: shows a three-dimensional view on a radiator mounted on a support arrangement, wherein the radiator is fed via slots.

FIG. 2 shows the at least one radiator 3 in more detail. The at least one radiator 3 comprises first and second dipoles 15, 18. The first dipole 15 comprises a first and a second dipole half 16, 17. The second dipole 18 comprises a first and a second dipole half 19, 20.

The first and second dipoles 15, 18 are arranged at the first side 2*a* of the support arrangement 2. A reflector arrangement 13 is also shown comprising sidewalls. Each dipole half 16, 17, 19, 20 comprises first and second connecting elements 21, 22, wherein the first and second connecting elements comprise a first end 23 and a second end 24.

Each connecting element 21, 22 is arranged with its first end 23 on the support arrangement 2 and extends away from it. Each connecting element 21, 22 could be aligned perpendicular to the support arrangement 2 or at an angle. Each dipole half 16, 17, 19, 20 comprises a radiator structure 25. The second ends 24 of the first and the second connecting elements 21, 22 of the respective dipole half 16, 17, 19, 20 are connected to one another via the radiator structure 25 of the respective dipole half 16, 17, 19, 20. In other words, the second ends 23 of the first and the second connecting element 21, 22 of one dipole half 16, 17, 19, 20 are connected to each other via the radiator structure 25.

The radiator structure 25 is preferably aligned parallel to the support arrangement 2. However, the radiator structure 25 could also be aligned at an angle towards or away from the support arrangement 2.

As will be explained in the following, each dipole half 16, 17, 19, 20 is feedable via its first and/or the second connecting element 21, 22 and is also coupled or connected to ground via its first and/or second connecting element 21, 22.

Figures 3A, 3B, 3C:
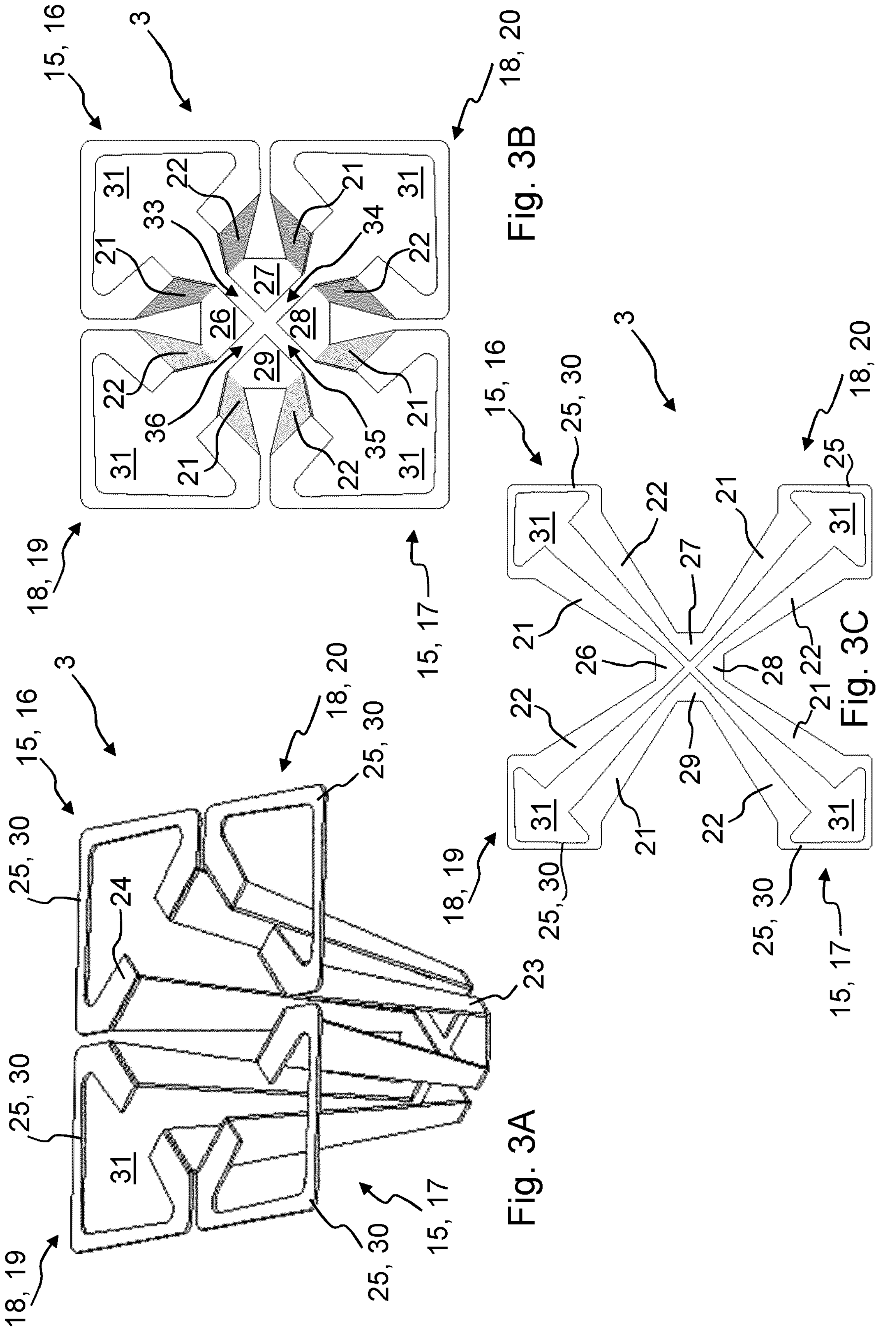
FIGS. 3A, 3B: show different views of a radiator.
FIG. 3C: shows a top view on a radiator before being bent to the shape shown in FIG. 3A.

FIGS. 3A, 3B show different views of the radiator 3 of FIG. 2.

It can be seen that the at least one radiator 3 with its first and second dipoles 15, 18 is made of a single piece.

The connecting element 21, 22 of the first dipole half 16 of the first dipole 15 is formed integrally with the connecting element 21, 22 of the adjacent first dipole half 19 of the second dipole 18 in the region of the respective first ends 23.

Also, a connecting element 21, 22 of the second dipole half 17 of the first dipole 15 is formed integrally with the connecting element 21, 22 of the adjacent second dipole half 20 of the second dipole 18 in the region of the respective first ends 23.

This can also be described more precisely with respect to FIG. 3B. The first connecting element 21 of the first dipole half 16 of the first dipole 15 is formed integrally with the second connecting element 22 of the first dipole half 19 of the second dipole 18 in the region of the respective first ends 23. In that case a first support surface 26 formed. The second connecting element 22 of the first dipole half 16 of the first dipole is formed integrally with the first connecting element 21 of the second dipole half 20 of the second dipole 18 in the region of the respective first ends 23 thereby forming a second support surface 27.

The first connecting element 21 of the second dipole half 17 of the first dipole 15 is formed integrally with the second connecting element 22 of the second dipole half 20 of the second dipole 18 in the region of the respective first ends 23 thereby forming a third support surface 28.

The second connecting element 22 of the second dipole half 18 of the first dipole 15 is formed integrally with the first connecting element 21 of the first dipole half 19 of the second dipole 18 in the region of the respective first ends 23 thereby forming a fourth support surface 29.

As such, the at least one radiator 3 is formed in a single piece.

FIG. 3C shows a top view of the at least one radiator 3 of FIGS. 3A, 3B before it is bent. The at least one radiator 3 is preferably punched and/or lasered out of a sheet metal. After that, the respective first and second connecting elements 21, 22 are bent upwards and the respective radiator structure 25 is bent downwards. Preferably the radiator structure 25 is bent approximately parallel to the support arrangement 2.

The support arrangement 2 comprises a metal layer 8*a* on the first side 2*a* which is connected to ground. The first, second, third and fourth support surfaces 26, 27, 28, 29 are arranged on said metal layer 8*a*.

Preferably a dielectric is arranged between the metal layer 8*a* and the first, second, third and fourth support surfaces 26, 27, 28, 29. More preferably, the dielectric is formed of a solder resist.

In that case the coupling to ground is made without the use of a solder joint. However, the first, second, third and/or fourth support surface 26, 27, 28, 29 could also be soldered to the metal layer 8*a* on the first side 2*a* of the support arrangement 2. It could also be possible, that a part of the first, second, third and/or fourth support surfaces 26, 27, 28, 29 extends through the support arrangement 2 so that the respective part can be soldered to the metal layer 8*b* on the second side 2*b* of the support arrangement 2.

However, the first, second, third and/or fourth support surface 26, 27, 28, 29 is preferably glued to the first side 2*a* of the support arrangement 2.

Figure 3D:
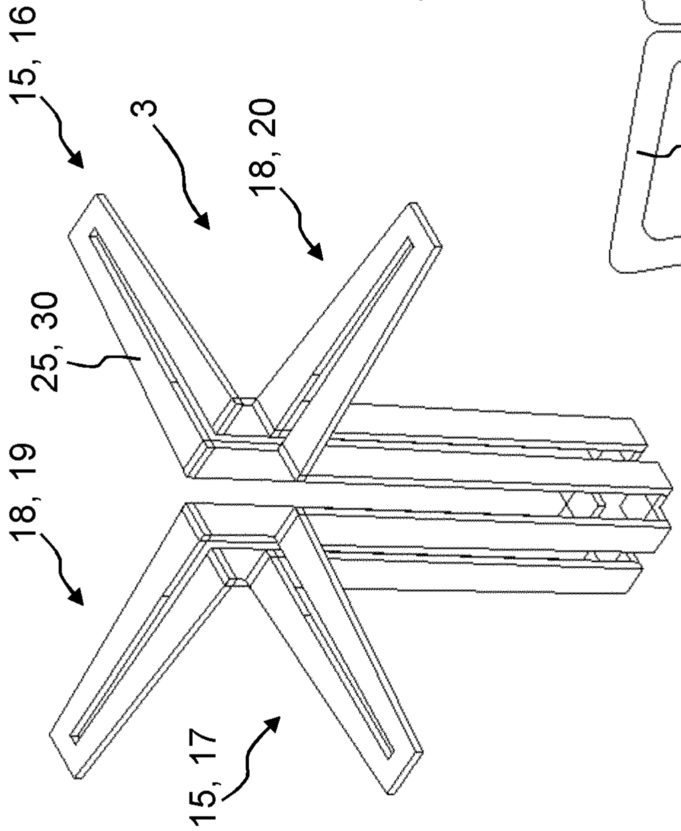
FIGS. 3D, 3E, 3F, 3G, 3H: show different embodiments of radiators.
Figure 3E:
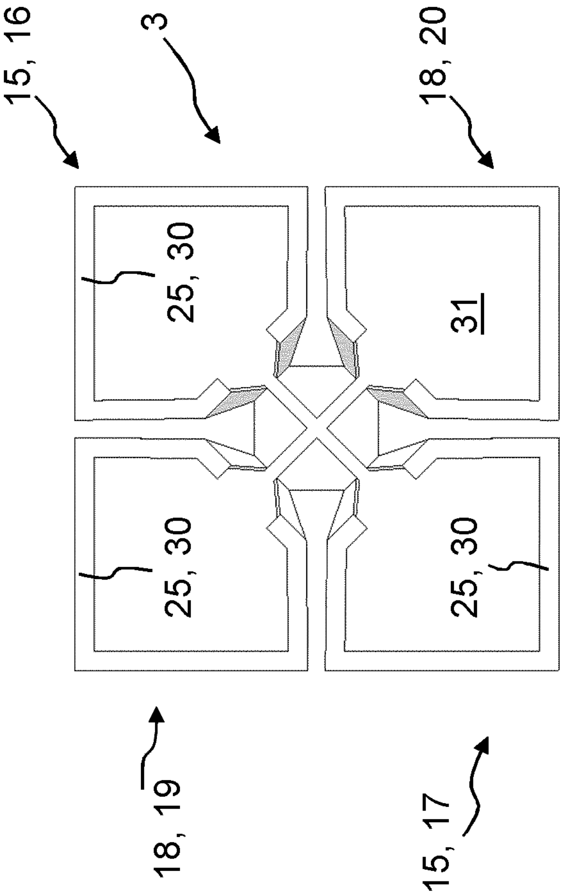
Figure 3F:
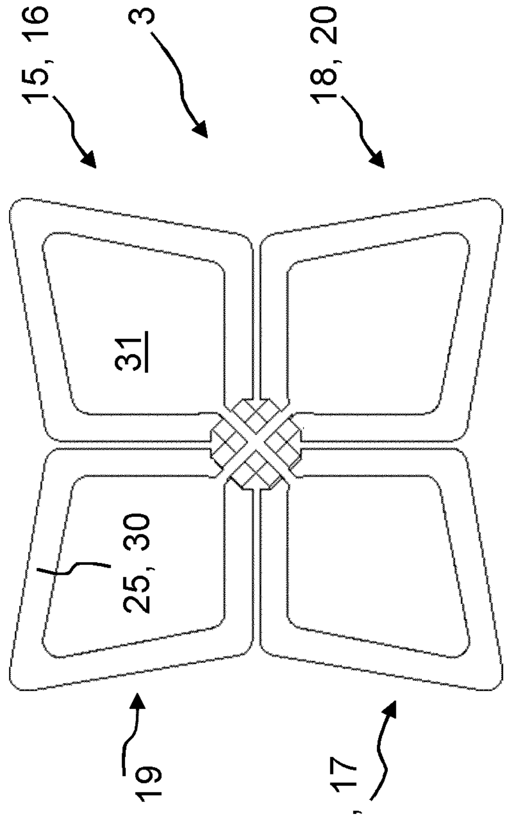

FIGS. 3D, 3E, 3F. 3G. 3H, 3I show different embodiments of the mobile communication antenna 1. As can be seen, the shape of the radiator structure 25 can have different forms.

Within FIG. 3D the respective first and second connecting element 21, 22 are aligned almost or fully perpendicular to the support arrangement 2. Furthermore, the radiator structure 25 of each dipole half 16, 17, 19, 20 is also aligned almost or fully parallel to the support arrangement 2.

The radiator structure 25 of each dipole half 16, 17, 19, 20 comprises radiator segments 30. The radiator segments 30 extend away from the first and second connecting elements 21, 22 starting at their second ends 24. Within FIG. 3D the radiator segments 30 of each of the dipole halves 16, 17, 19, 20 run approximately parallel to each other, wherein they join at an end, thereby enclosing an area in between.

Regarding FIG. 3E each radiator structure 25 is almost square-like except at the beginning at the second ends 24 at the respective first and second connecting elements 21, 22.

Referring the FIG. 3F, it is shown that the outer most edges of each of the radiator structures 25 are extending further outwards to that the adjacent segments (at the outer most edges) are no longer aligned perpendicular to each other as shown in FIG. 3E, but at an angle.

Figure 3H:
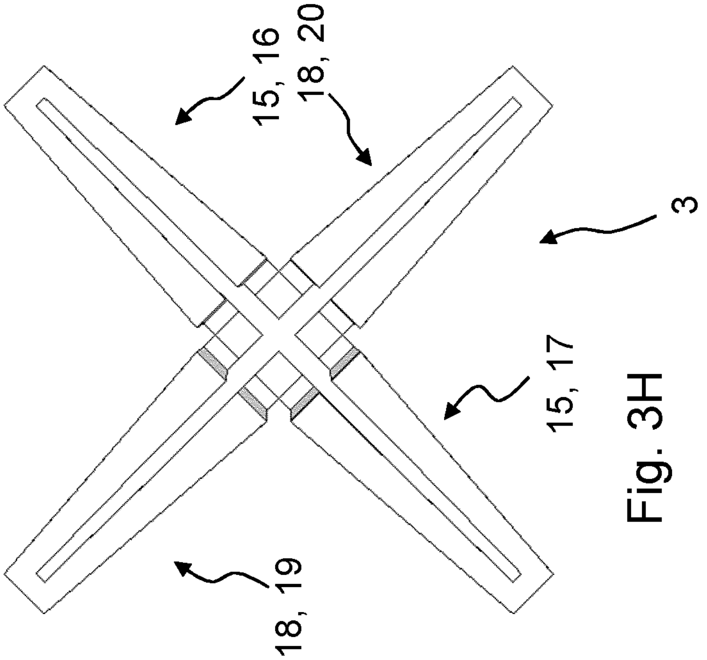
Figure 3I:
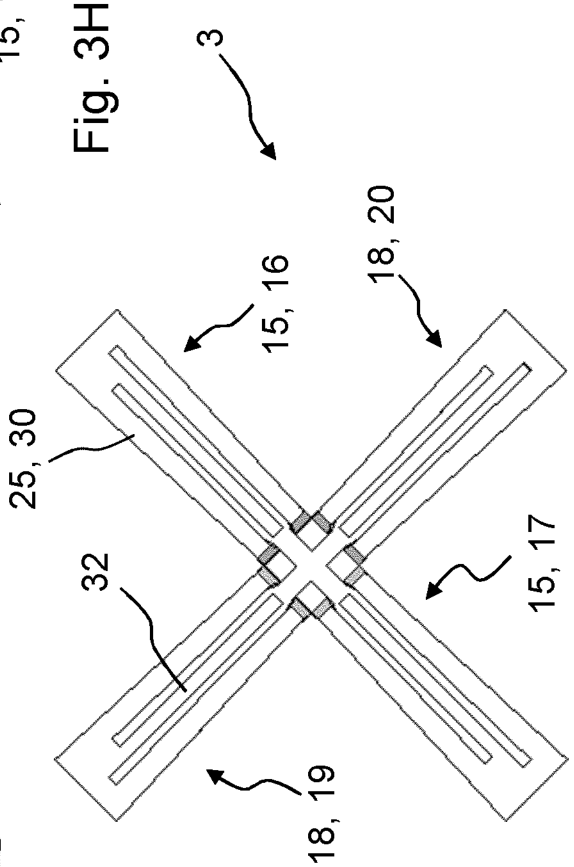
FIG. 3I: shows another embodiment of a broadband radiator.
Figure 3G:
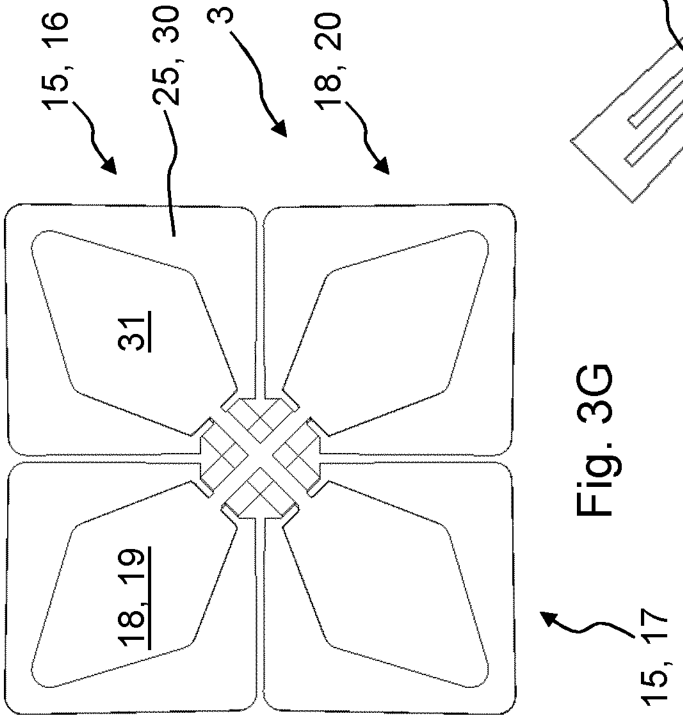

Referring to FIG. 3G, it is shown that the area 31 which is enclosed by each of the radiator structures 25 has shape that differs from the outline of the respective segments 30 of the radiator structure 25. In other words, the radiator segments 30 change their width along their respective length.

FIG. 3H is turn similar to FIG. 3D.

The embodiment of FIG. 3I has a radiator structure 25 which comprises a separation segment 32, whereby the area 31 is separated into two sub-areas of different length such that the radiator structure 25 is configured to operate in different mobile communication bands. The separation segment 32 extends from the position where two radiator segments 30 join. The separation segment then runs towards the second end 24 of the first and second connecting elements 21, 22 and ends spaced apart therefrom.

Figure 4B:
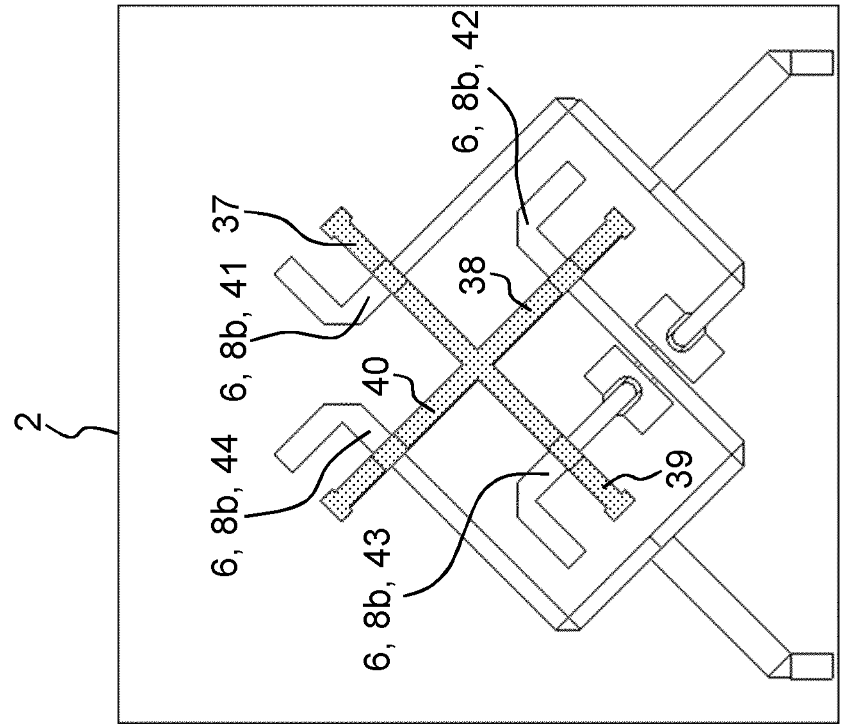
Figure 4A:
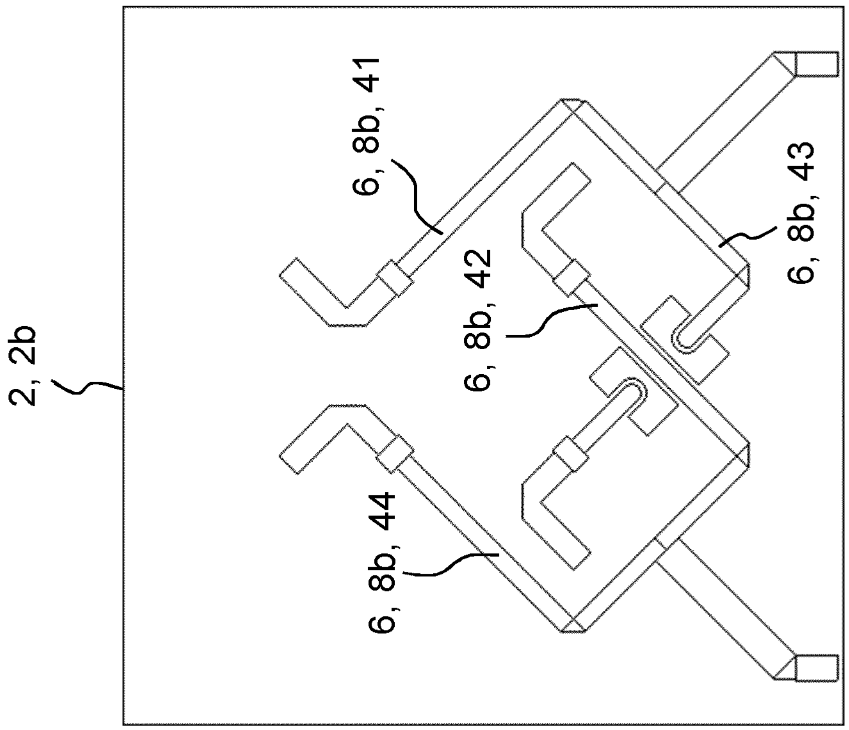

FIGS. 4A, 4B show how the at least one radiator 3 is fed with a signal and how a signal is received. FIG. 4A shows a view on the second side 2*b* of the support arrangement 2 without grounded parts of the metal layer 8*b*. Instead the structures depicted are part the signal line 6 which is formed by parts of the metal layer 8*b*.

Reference is also made to FIG. 2. Within FIG. 2 as well as within FIG. 3B it can be seen that the first and second support surfaces 26, 27 are spaced apart from each other thereby forming a first gap 33. The second and the third support surfaces 27, 28 are also spaced apart from each other thereby forming a second gap 34. The third and fourth support surfaces 28, 29 are spaced apart from each other thereby forming a third gap 35. The fourth and first support surfaces 29, 26 are also space apart from each other forming a fourth gap 36. A metal layer 8*a* on the first side 2*a* of the support arrangement 2 comprise first, second, third and fourth recesses in the region of the gaps 33, 34, 35, 36 thereby forming first, second, third and fourth slots 37, 38, 39, 40, respectively.

The first, second, third and fourth slots 37, 38, 39, 40 can be seen in FIG. 4B. The first and third slots 37, 39 join each other. The second and fourth slots 38, 40 also join each other. The first and thirds slots 37, 39 are used for a first polarisation and are aligned perpendicular to the second and fourth slots 38, 40 which are used for a second polarisation.

However, the first and third slots 37, 39 could also end spaced apart from each other. However, they are preferably aligned coaxially. The second and fourth slots 38, 40 could also end spaced apart from each other. However, they are preferably aligned coaxially to each other.

The slots 37, 38, 39, 40 are preferably filled with the dielectric 7 of the support arrangement 2, namely the dielectric 7 of the printed circuit board arrangement. The slots 37, 38, 39, 40 could also be filled with air.

Referring back to FIG. 4A which shows a view on the second side 2*b* of the support arrangement 2 without the grounded parts of the metal layer 8*b*. If the first side 2*a* of the support arrangement 2 comprises a ground structure (ground plane) that can act as reflector or part of the reflector arrangement 13 for example, then the second side 2*b* does not need a ground structure (ground plane) too. However, a ground structure (ground plane) can always be applied to the first side 2*a* and/or the second side 2*b* of the support arrangement 2. Ground structures could be applied for improving the microstrip crossover electrically or when there is the need for connecting a cable. Instead, only the signal lines 6 are shown which are also formed by parts of the metal layer 8*b* which are separated from the remaining parts of the metal layer 8*b* which is connected to ground. As such the second side 2*b* of the support arrangement 2 comprises first, second, third and fourth feed structures 41, 42, 43, 44. As can be seen in FIG. 4B which only shows the first, second, third and fourth feed structures 41, 42, 43, 44 as well as the first, second, third and fourth slots 37, 38, 39, 40, the first feed structure 41 crosses the first slot 37. The second feed structure 42 crosses the second slot 38. The third feed structure 43 crosses the third slot 39 and the fourth feed structure 44 crosses the fourth slot 40. The crossing takes place at an angle of about 90°.

In addition, the first feed structure 41 is a metal layer 8*b* on the second side 2*b* of the support arrangement 2, wherein the first feed structure 41 widens in the region of the first slot 37. The second feed structure 42 is a metal layer 8*b* on the second side 2*b* of the support arrangement 2, wherein the second feed structure 42 widens in the region of the second slot 38. The third feed structure 43 is a metal layer 8*b* on the second side 2*b* of the support arrangement 2, wherein the third feed structure 43 widens in the region of the third slot 39. The fourth feed structure 44 is a metal layer 8*b* on the second side 2*b* of the support arrangement 2, wherein the fourth feed structure 44 widens in the region of the fourth slot 40.

The first, second, third and fourth recesses in the metal layer 8*a* on the first side 2*a* of the support arrangement 2 comprises a widened end, whereby the first, second, third and fourth slots 37, 38, 39, 40 also comprise a widened end.

The first, second, third and fourth feed structures 41, 42, 43, 44 preferably widen towards the open end.

The length of the first, second, third and fourth feed structures 41, 42, 43, 44 from where they cross the respective slot 37, 38, 39, 40 to the open end is approximately λ/4. This allows that signal power is reflected directly towards the respective slot 37, 38, 39, 40.

The first and the third feed structures 41, 43 are connected together and are fed by the same first signal. The second and the fourth feed structures 42, 44 are connected together and are fed by the same second signal. FIG. 4B shows that the length of the signal lines 6 to the first and third feed structures 41, 43 and the length of the signal lines 6 to the second and fourth feed structures 42, 44 are approximately the same. As such, the signal is fed in phase.

Figure 5:
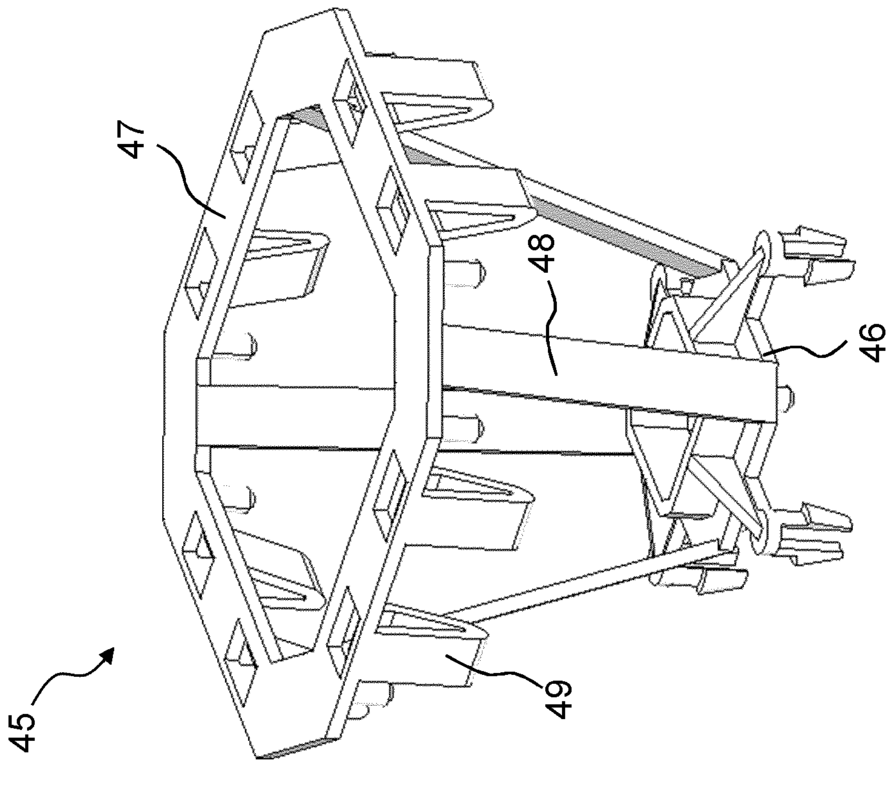
FIG. 5: shows a holding device for a radiator.

FIG. 5 shows a holding device 45 for holding the at least one radiator 3 in place. Preferably, the at least one radiator 3 is glued to the first side 2*a* of the support arrangement 2. However, the holding device 45 could also be used. The holding device 44 is preferably clipped into the support arrangement 2. The holding device 45 comprises a lower section 46 under which the first, second, third and fourth support surfaces 26, 27, 28, 29 are arranged. Spaced apart from the lower section 46, there is an upper section 47. The lower section 46 and the upper section 47 are connected to each other via a connecting segment 48. The upper section 47 comprises fixating elements 49 which engage with openings in the radiator structure 25. The fixating elements 49 preferably extend from the upper section 47 towards the lower section 46. The holding devices 45 is preferably made of a dielectric and more preferably made of plastic material. The holding device 45 is preferably formed in a single piece.

Figure 6:
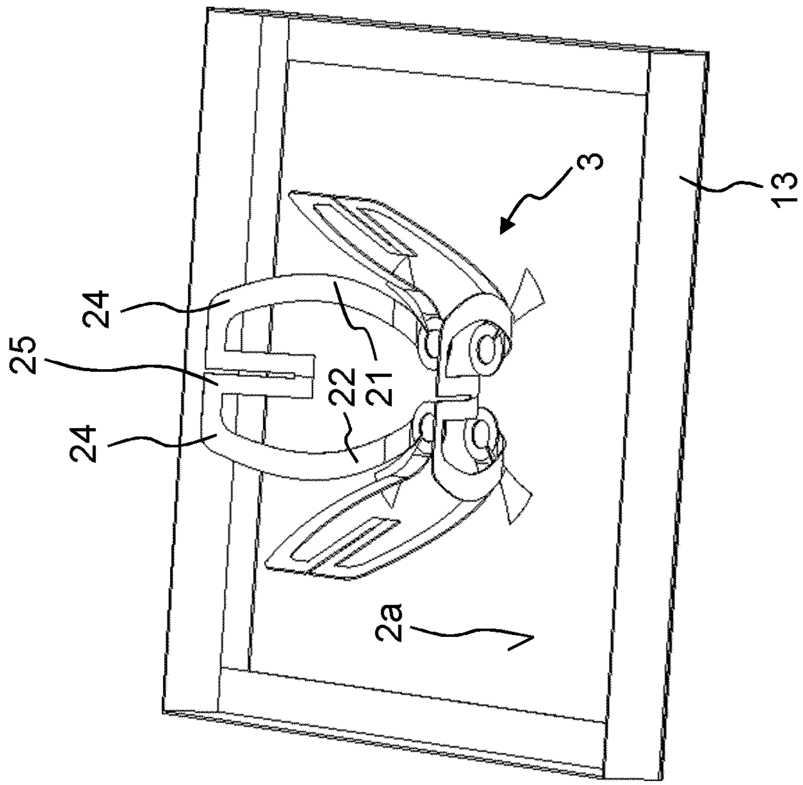
FIGS. 6, 7A, 7B: show another embodiment as well as a respective feeding structure for such a radiator that can be operated at lower frequencies.
Figure 7B:
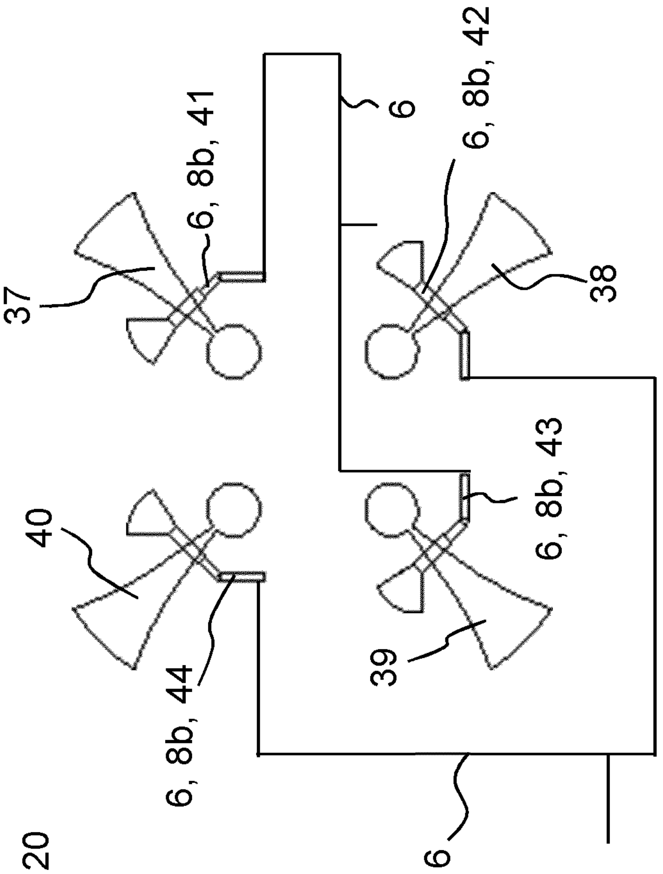
Figure 7A:
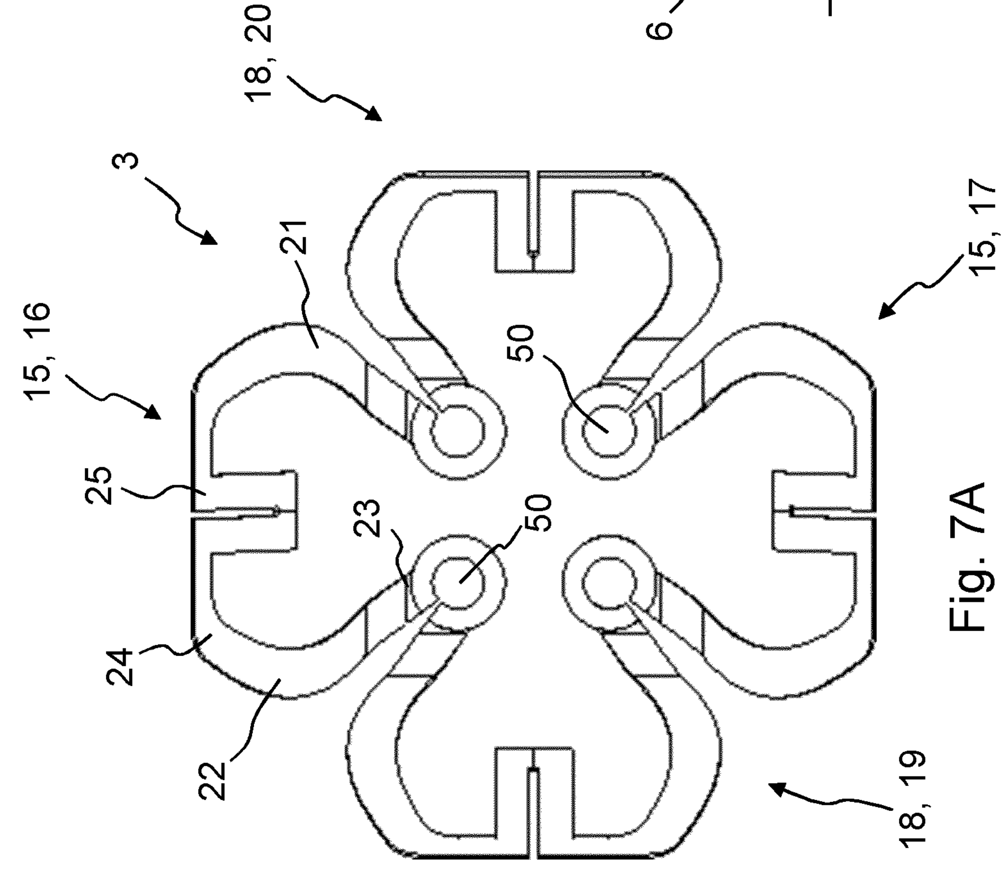

FIGS. 6, 7A and 7B show another version of the at least one radiator 3. In that case, the radiator 3 can be used the lower frequencies compared to the radiator 3 in the previous figures. The radiator structure 25 does not extend away to the outside from the second ends 24 of the first and second connecting elements 21, 22 of each dipole half 16, 17, 19, 20, but connects the second ends 24 of the respective first and second connecting elements 21, 22 directly. However, it could also be that the radiator structure 25 is U-shaped thereby running towards the support arrangement 2.

The first and the second connecting elements 21, 22 are C-shaped. In the middle they are spaced further apart from each other than the region of the first and second ends 23, 24.

The first, second, third and fourth support surfaces 26, 27, 28, 29 comprise a cutout 50 that is open to one side. The cutout 50 has preferably a circumferential diameter. A metal layer 8*a* on the first side 2*a* of the support arrangement 2 comprises first, second, third and fourth recesses in the region of the respective cutouts 50, thereby forming first, second, third and fourth slots 37, 38, 39, 40. A second side 2*b* of the support arrangement 2 comprises first, second, third and fourth feed structures 41, 42, 43, 44.

The first feed structure 41 crosses the first slot 37. The second feed structure 42 crosses the second slot 38. The third feed structure 43 crosses the third slot 39. The fourth feed structure 44 crosses the fourth slot 40.

The first feed structure 41 and the third feed structure 43 are fed with the same signal. The signal lines 6 to the first feed structure 41 and to the third feed structure 43 are preferably of the same length. The second feed structure 42 and the fourth feed structure 44 are fed with the same signal. The signal lines 6 to the second feed structure 42 and to the fourth feed structure 44 are preferably of the same length.

The respective first, second, third, fourth slot 37, 38, 39, 40 have one end which form is preferably adapted to the form of the respective cutout 50. In that case, the form corresponds to circle. Starting from this one end, the respective first, second, third, fourth slot 37, 38, 39, 40 widens towards a second end. The slots 37, 38, 39, 40 are not connected to each other in this embodiment.

The first, second, third and fourth feed structure 41, 42, 43, 44 crosses the respective first, second, third, fourth slot 37, 38, 39, 40 between the first and second ends of the respective slot 37, 38, 39, 40. Preferably, the respective feed structure 41, 42, 43, 44 crosses the respective slot 37, 38, 39, 40 at a region closer to the first end than to the second end.

Referring again to FIG. 6, it can be seen that by having cutouts 50 in the first, second, third and fourth support surface 26, 27, 28, 29, first and second connecting elements 21, 22 which are not connected to each other via the radiator structure 25 are fed with the same signal.

Figure 8B:
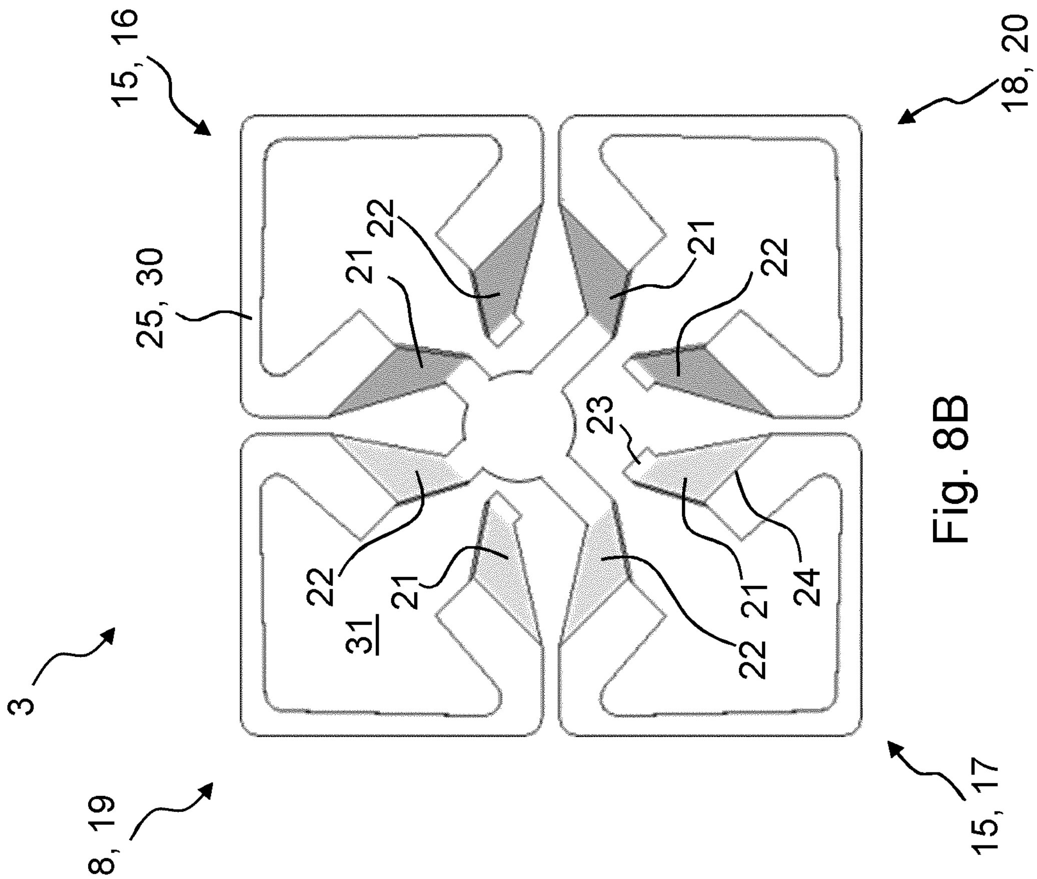
FIGS. 8A, 8B: show another embodiment of a radiator which can be soldered to the support arrangement.
Figure 8A:
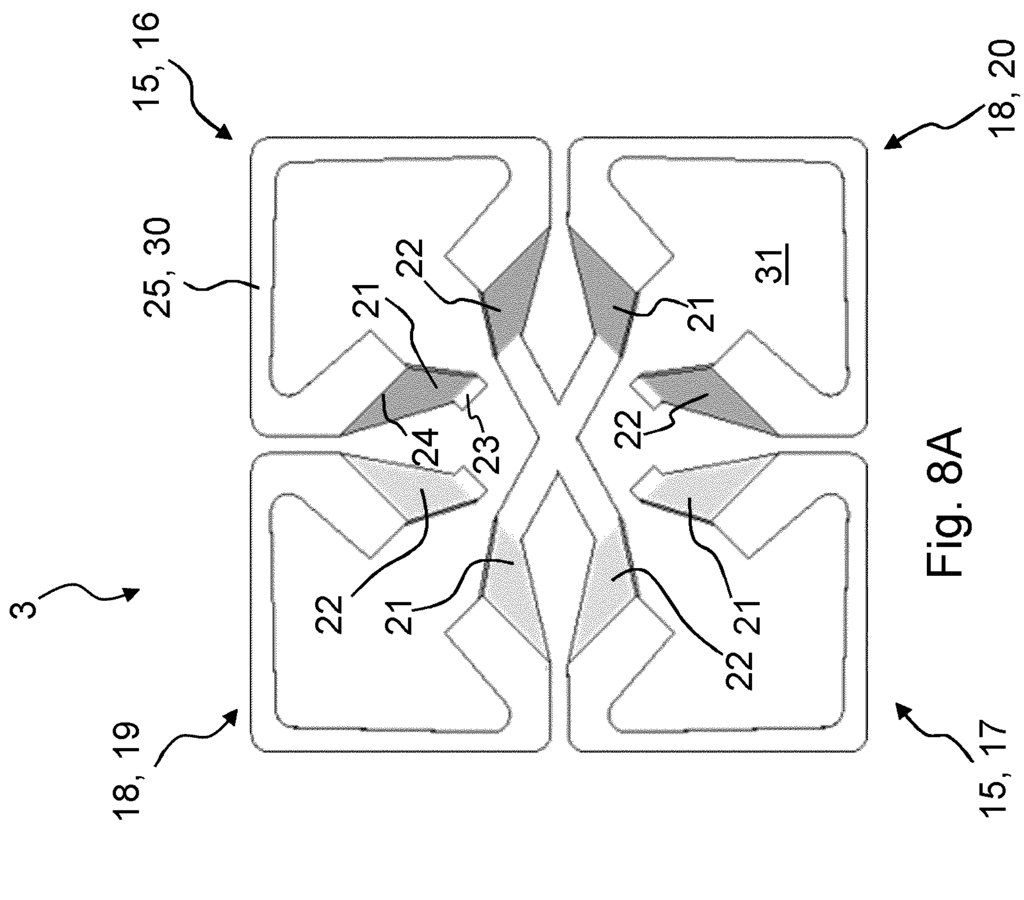

FIGS. 8A, 8B show another embodiment of a radiator 3 of the mobile communication antenna 1.

In that case, exactly one connecting element 21, 22 of the first dipole half 16 of the first dipole 15 and exactly one connecting element 21, 22 of the second dipole half 17 of the first dipole 15 and exactly one connecting element 21, 22 of the first dipole half 19 of the second dipole 18 and exactly one connecting element 21, 22 of the second dipole half 20 of the second dipole 18 are connected to each other and formed in one piece. They are preferably capacitively coupled to ground. A galvanic connection, for example by the use of solder would also be possible. Preferably, the respective connecting elements 21, 22 cross each other approximately in the centre area of the radiator 3. This connection could preferably be enlarged so that the coupling is increased.

The other connecting element 22, 21 of the first dipole half 16 of the first dipole 15 and the other connecting element 22, 21 of the second dipole half 17 of the first dipole 15 are feedable with a first signal in phase or antiphase. Those other connecting elements 22, 21 are preferably soldered to a respective signal line 6. They could also extend through the support arrangement 2 and in turn be soldered on the second side 2*b* of the support arrangement 2 to the respective signal line 6.

The other connecting element 22, 21 of the first dipole half 19 of the second dipole 18 and the other connecting element 22, 21 of the second dipole half 20 of the second dipole 18 are feedable with a second signal in phase or antiphase. Those other connecting elements 22, 21 are preferably soldered to a respective signal line 6. They could also extend through the support arrangement 2 and in turn be soldered on the second side 2*b* of the support arrangement 2 to the respective signal line 6.

Within FIG. 8A, the other connecting elements 22, 21 are fed antiphase (180° phase). Such a feeding could be realized by different lengths of the signal lines. This is because the respective other connecting elements 22, 21 of the first dipole 15 are arranged on different sides of the connection between the connecting elements 21, 22 of the first dipole which are coupled to ground. The same is also true for the second dipole 18.

Within FIG. 8B, the other connecting elements 22, 21 are fed in phase (0° phase). This is because the respective other connecting elements 22, 21 of the first dipole 15 are arranged on the same side of the connection between the connecting elements 21, 22 of the first dipole which are coupled to ground. The same is also true for the second dipole 18.

Figure 9:
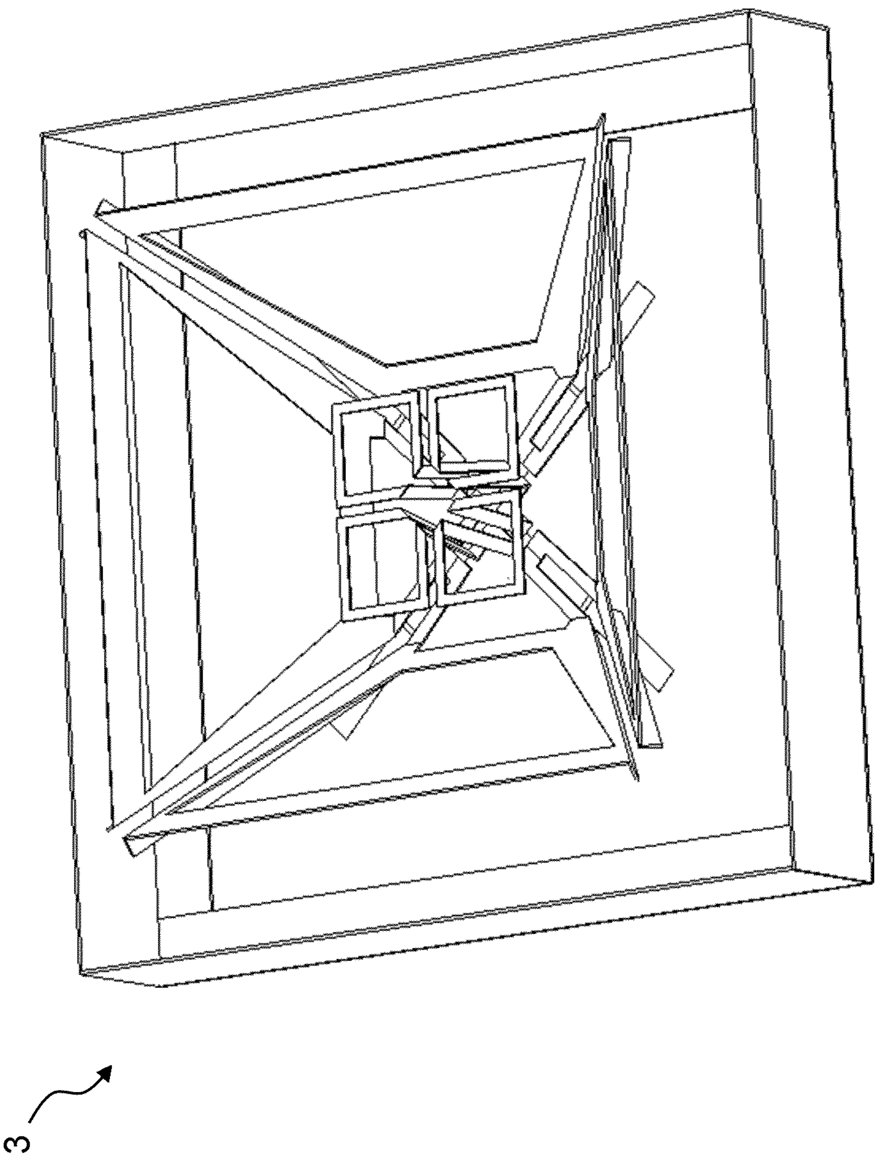
FIGS. 9, 10A, 10B, 10C: show another embodiment of a first radiator which is arranged within a second radiator as well as the corresponding feeding structure.

FIG. 9 shows two different types of radiators 3 according to the present invention. A first radiator is built according to FIGS. 2 to 4B. A second radiator is built according to FIGS. 6, 7A, 7B. The first radiator is arranged within the second radiator.

Figure 10B:
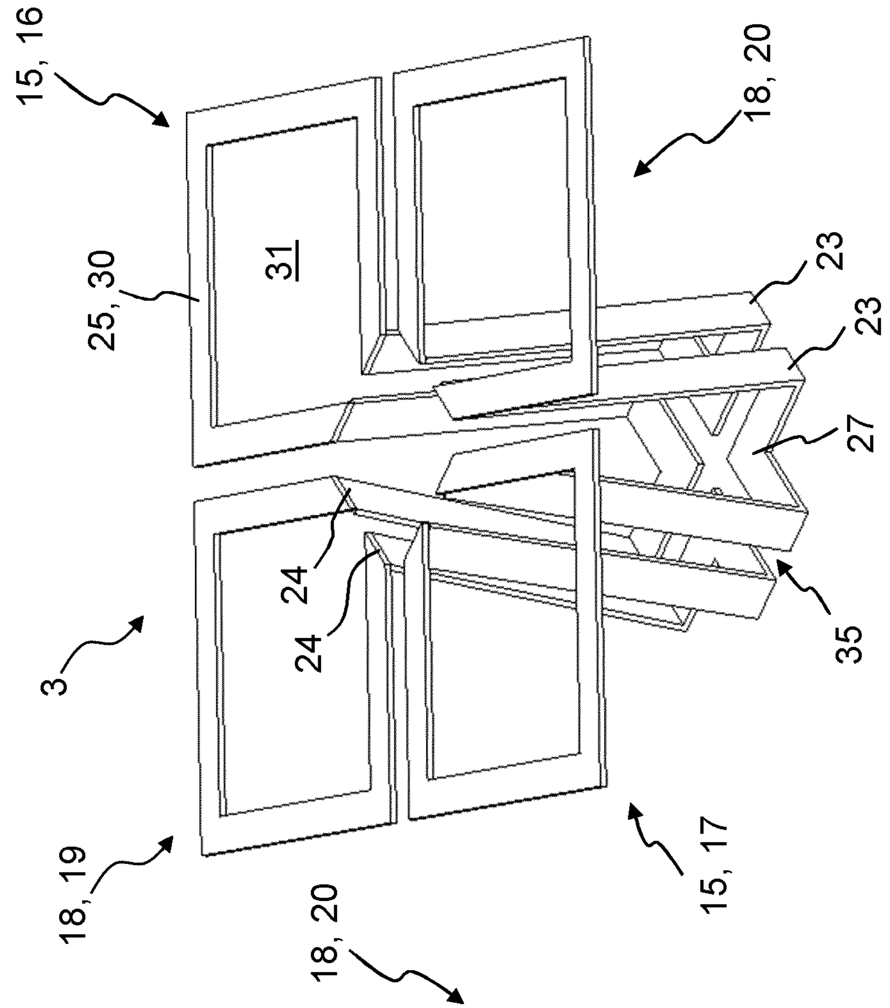
Figure 10A:
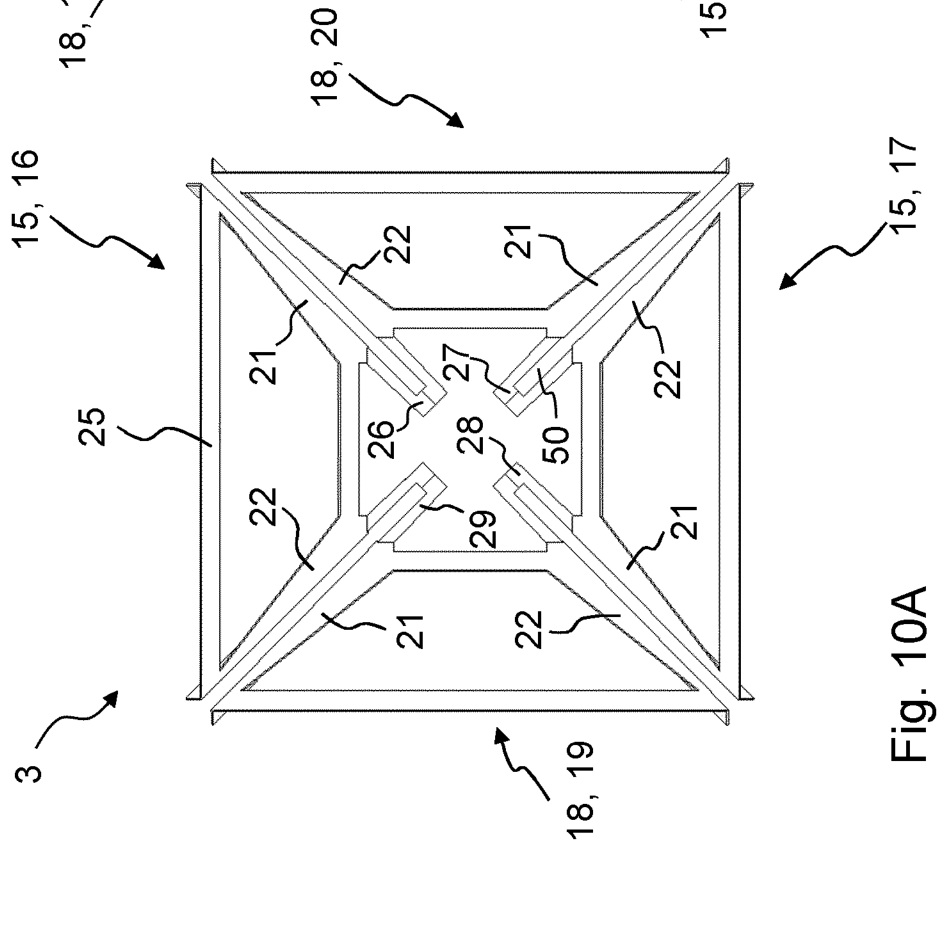

FIG. 10A shows the second radiator, wherein the first, second, third and fourth support surfaces 26, 27, 28, 29 comprise cutouts 50 and wherein all the dipole halves are connected to each other by the respective support surfaces 26, 27, 28, 29. Each connecting element 21, 22 is connected to its first and second neighbouring connecting element 21, 22 in the region of its first end 23. The connection to the closest neighbouring connecting element 21, 22 comprises the cutout 50 for feeding both connecting elements 21, 22. The radiator structure 25 runs directly between the second ends 24 of the respective connecting element 21, 22. As such a trapezial structure is formed between two connecting elements 21, 22.

Figure 10C:
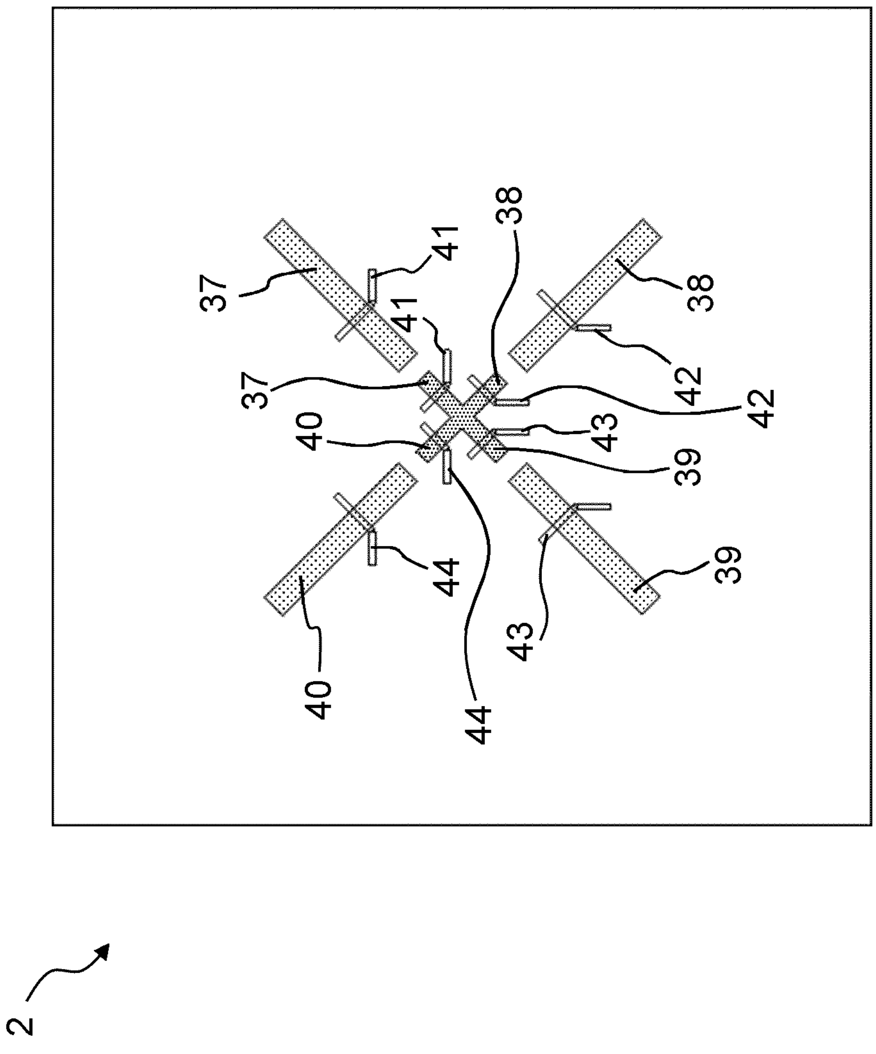

FIG. 10B shows the first radiator. Since the respective slots 37, 38, 39, 40 of the second radiator do not join each other, the first radiator can be placed inside the second radiator. This is shown within FIG. 10C. In the centre, the slots 37, 38, 39, 40 as well as the feed structures 41, 42, 43, 44 for the first (inner) radiator are shown. The slots 37, 38, 39, 40 join each other. They are surrounded by first, second, third, fourth slots 37, 38, 39, 40 with corresponding feed structures 41, 42, 43, 44 of the second radiator.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A mobile communication antenna with a support arrangement and at least one radiator, comprising the following features:

the at least one radiator comprises first and second dipoles, wherein the first and second dipoles each comprise first and second dipole halves and the first and second dipoles are made of a single piece;

the first and second dipoles are arranged on a first side of the support arrangement;

each dipole half comprises first and second connecting elements, wherein the first and second connecting elements comprise a first end and a second end;

each connecting element is arranged with its first end on the support arrangement and extends away from it;

each dipole half comprises a radiator structure, wherein the second ends of the first and second connecting elements of the respective dipole half are connected to one another via the radiator structure of the respective dipole half;

each dipole half is, via the first and/or second connecting element:

a) feedable; and b) connected or coupled to ground.

2. The mobile communication antenna according to claim 1, characterized by the following feature:

the at least one radiator is a:

a) bent part; and b) punched and/or lasered part.

3. The mobile communication antenna according to claim 1, characterized by the following features:

a connecting element of the first dipole half of the first dipole is formed integrally with a connecting element of the adjacent first dipole half of the second dipole in the region of the respective first ends;

a connecting element of the second dipole half of the first dipole is formed integrally with a connecting element of the adjacent second dipole half of the second dipole in the region of the respective first ends.

4. The mobile communication antenna according to claim 1, characterized by the following features:

the first connecting element of the first dipole half of the first dipole is formed integrally with the second connecting element of the first dipole half of the second dipole in the region of the respective first ends thereby forming a first support surface;

the second connecting element of the first dipole half of the first dipole is formed integrally with the first connecting element of the second dipole half of the second dipole in the region of the respective first ends thereby forming a second support surface;

the first connecting element of the second dipole half of the first dipole is formed integrally with the second connecting element of the second dipole half of the second dipole in the region of the respective first ends thereby forming a third support surface;

the second connecting element of the second dipole half of the first dipole is formed integrally with the first connecting element of the first dipole half of the second dipole in the region of the respective first ends thereby forming a fourth support surface.

5. The mobile communication antenna according to claim 4, characterized by the following features:

the support arrangement comprises a metal layer on the first side which is connected to ground;

the first, second, third and fourth support surfaces are arranged on said metal layer.

6. The mobile communication antenna according to claim 5, characterized by the following feature:

a dielectric is arranged between the metal layer and the first, second, third and fourth support surfaces, wherein the dielectric is preferably formed of solder resist.

7. The mobile communication antenna according to claim 4, characterized by the following feature:

the first, second, third and/or fourth support surface is glued to the first side of the support arrangement.

8. The mobile communication antenna according to claim 4, characterized by the following features:

the first and second support surfaces are spaced apart from each other forming a first gap;

the second and third support surfaces are spaced apart from each other forming a second gap;

the third and fourth support surfaces are spaced apart from each other forming a third gap;

the fourth and first support surfaces are spaced apart from each other forming a fourth gap;

a metal layer on the first side of the support arrangement comprises first, second, third and fourth recesses in the region of the gaps, thereby forming first, second, third and fourth slots, respectively;

a second side of the support arrangement comprises first, second, third and fourth feed structures;

the first feed structure crosses the first slot;

the second feed structure crosses the second slot;

the third feed structure crosses the third slot;

the fourth feed structure crosses the fourth slot.

9. The mobile communication antenna according to claim 8, characterized by the following features:

the first feed structure is a metal layer on the second side of the support arrangement, wherein the first feed structure widens in the region of the first slot; and/or the second feed structure is a metal layer on the second side of the support arrangement, wherein the second feed structure widens in the region of the second slot; and/or the third feed structure is a metal layer on the second side of the support arrangement, wherein the third feed structure widens in the region of the third slot; and/or the fourth feed structure is a metal layer on the second side of the support arrangement, wherein the fourth feed structure widens in the region of the fourth slot.

10. The mobile communication antenna according to claim 8, characterized by the following features:

the first, second, third and fourth recesses comprise a widened end, whereby the first, second, third and fourth slots also comprise a widened end; and/or the first, second, third, and fourth feed structures widen towards their open ends; and/or the length of the first, second, third and fourth feed structures from where they cross the respective slot to their open ends is approximately $\lambda/4$.

11. The mobile communication antenna according to claim 4, characterized by the following features:

the first, second, third, and fourth support surfaces comprise a cutout that is open to one side;

a metal layer on the first side of the support arrangement comprises first, second, third and fourth recesses in the region of the first, second, third and fourth cutouts of the respective support surface, thereby forming first, second, third and fourth slots, respectively;

a second side of the support arrangement comprises first, second, third and fourth feed structures;

the first feed structure crosses the first slot, the second feed structure crosses the second slot, the third feed structure crosses the third slot, and the fourth feed structure crosses the fourth slot, whereby two connecting elements of different dipole halves of different dipoles are feedable with the same signal.

12. The mobile communication antenna according to claim 1, characterized by the following feature:

the at least one radiator is attached to the support arrangement with its first and second dipoles without solder.

13. The mobile communication antenna according to claim 1, characterized by the following features:

exactly one connecting element of the first dipole half of the first dipole and exactly one connecting element of the second dipole half of the first dipole and exactly one connecting element of the first dipole half of the second dipole and exactly one connecting element of the second dipole half of the second dipole are connected to each other and formed in one piece and are capacitively coupled or galvanically connected to ground;

the other connecting element of the first dipole half of the first dipole and the other connecting element of the second dipole half of the first dipole are feedable with a first signal in phase or in antiphase;

the other connecting element of the first dipole half of the second dipole and the other connecting element of the second dipole half of the second dipole are feedable with a second signal in phase or in antiphase.

14. The mobile communication antenna according to claim 1, characterized by the following features:

the radiator structure of each dipole half comprises radiator segments extending away from the first and second connecting elements of the respective dipole half and run towards each other being connected to each other, thereby enclosing an area;

the radiator structure comprises a separation segment, whereby the area is separated into two sub-areas of different lengths such that the radiator structure is configured to operate in different mobile communication bands.

15. The mobile communication antenna according to claim 1, characterized by the following features:

a plurality of radiators is arranged on the first side of the support arrangement;

the support arrangement is a printed circuit board;

a metal sheet arrangement and/or partially metallized dielectrics is arranged between some or all of the radiators on the first side of the support arrangement, thereby forming a reflector arrangement.

* * * * *